Nov. 20, 1962 R. W. ANTHONY ETAL 3,064,809
GEAR SORTING MACHINE
Filed June 27, 1960

*INVENTORS*
RUSSEL W. ANTHONY
JOEL M. BECKMAN JR.
BY Whittemore
Hulbert & Belknap ATTORNEYS 3,064,809
GEAR SORTING MACHINE
Russel W. Anthony, Detroit, and Joel M. Beckman, Jr., Pontiac, Mich., assignors to National Broach & Machine Company, Detroit, Mich., a corporation of Michigan
Filed June 27, 1960, Ser. No. 38,887
22 Claims. (Cl. 209—88)

The invention relates to gear gauging and refers more specifically to a method of and means for accurately determining the departure of the characteristics of work gears from desired characteristics by comparing the work gears with a checking gear the characteristics of which have previously been compared with the desired characteristics and combining the results of the comparisons.

In the past it has been the practice to determine departure of work gear characteristics, such as eccentricity or run-out and helix angle, from desired characteristics thereof by the use of a gear gauge for comparing the work gear with a master gear having the desired characteristics.

Due to the low tolerances in the characteristics of work gears that are presently demanded in industry the master gears used for such comparisons are expensive to produce and have a relatively short life since a small amount of wear significantly effects their characteristics. In addition gauge errors due to friction, inertia and other such causes inherent in the gear gauges used to compare the master gear with the work gears becomes a significant factor in the checking of gears for the extremely low tolerances required.

It is therefore one of the objects of the present invention to provide a method for determining the departure of characteristics of work gears from desired characteristics thereof without comparing a master gear with each individual work gear.

Another object is to provide means for determining the departure of characteristics of work gears from desired characteristics thereof without comparing a master gear with each individual work gear.

Another object is to provide a method of determining the departure of a characteristic of work gears from the same characteristic of a master gear comprising comparing the master gear with a checking gear, comparing the checking gear with the work gears and combining the result of the comparison of the master and checking gear with the result of each of the comparisons of the checking gear with a work gear.

Another object is to provide means for determining the departure of a characteristic of work gears from the same characteristic of a master gear comprising means for comparing the master gear with a checking gear, means for comparing the checking gear with the work gears and means for combining the result of the comparison of the master and checking gear with the result of each of the comparisons of the checking gear with a work gear.

Another object is to provide means for determining the departure of a characteristic of work gears from the same characteristic of a master gear as set forth above wherein the results of the comparisons are combined in such a manner as to cancel repetitive errors such as those due to friction, inertia and other similar phenomenon in the gauges used for the comparisons.

More specifically it is an object to provide a method of determining the departure of a characteristic of work gears from the same characteristic of a master gear comprising comparing the characteristic of the master gear with the characteristic of a checking gear and producing a signal representative of the departure of the characteristics thereof, storing the signal thus produced, comparing the checking gear with each work gear and producing signals representative of the sum of the departure from the characteristic of the master gear of both the characteristic of the checking gear and work gear and subtracting the stored signal from each of the last mentioned signals to produce signals representative of the departure of the characteristic of the work gears from the characteristic of the master gear.

More specifically it is an object to provide means for determining the departure of a characteristic of work gears from the same characteristic of a master gear comprising means for comparing the characteristic of the master gear with the characteristic of a checking gear and developing an electric signal representative of the difference in characteristics thereof, means for storing and repetitively reproducing the developed signal, means for comparing the checking gear with each work gear and developing electric signals representative of the sum of the departure from the characteristic of the master gear of both the characteristic of the checking gear and work gear, and means for reproducing said stored signal and electrically subtracting the reproduced signal from each of the last mentioned signals to provide signals representative of the departure of the characteristic of the work gears from the characteristic of the master gear.

Another object is to provide apparatus as set forth above wherein the departure of a plurality of separate characteristics of work gears from the same characteristics of a master gear may be determined by comparing the characteristics of the master gear with the separate characteristics of a plurality of checking gears, comparing the work gears with each of the plurality of checking gears and combining the results of the comparisons of the same checking gear to determine the departure of the separate characteristics of the work gears from the same characteristics of the master gear.

Another object is to provide a method of and means for determining the departure of work gear characteristics from the characteristics of a master gear as set forth above which is simple, economical and efficient.

Other objects and features of the invention will become apparent as the description proceeds, especially when taken in conjunction with the accompanying drawings, illustrating a preferred embodiment of the invention, wherein.

With particular reference to the figures, a specific embodiment of the present invention will now be disclosed.

Figure 1:
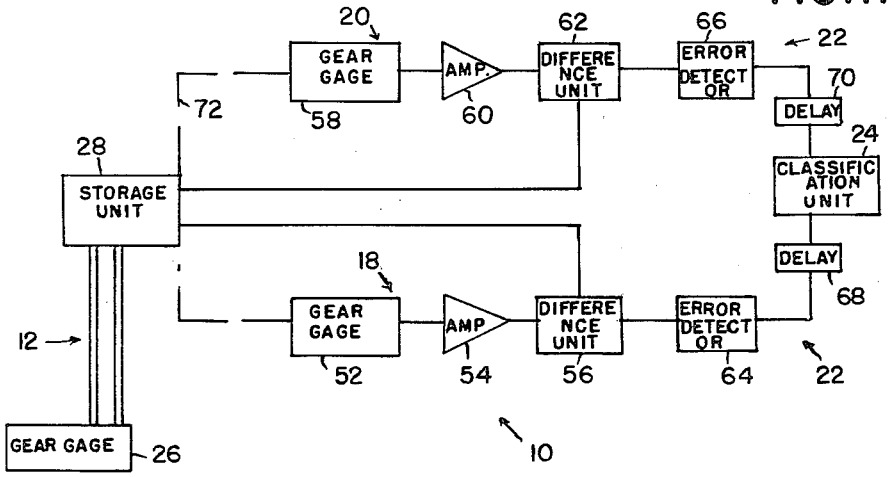
FIGURE 1 is a block diagram of apparatus for checking gear characteristics in accordance with the method of the invention.

The gear gauging apparatus 10 illustrated in FIGURE 1 comprises means 12 for developing and storing for repetitive reproduction signals representative of the departure of selected characteristics of a checking gear 14 from the characteristics of a master gear 16. Apparatus 10 further includes a plurality of separate channels 18 and 20 for developing signals representative of the departure of a selected characteristic of work gears from the characteristic of a checking gear previously compared with the same characteristic of a master gear by means 12, for amplifying the developed signal, and subtracting the signal thus obtained from the reproduced stored signal developed by the comparison of the checking gear with the master gear, to provide signals representative of the difference in the selected characteristic of the work gears and the same characteristic of the master gear.

In addition as indicated in FIGURE 1 separate means 22 are provided in each channel 18 and 20 to receive the signals representative of the difference in the characteristic of the master gear and work gears compared in the respective channel, to detect undesirable departures in the characteristic of the master gear and work gears, and feed delayed control signals to a gear classification unit 24 operable to sort the work gears in accordance with the departure of the characteristics of the work gears from the characteristics of the master gear.

Figures 2, 3:
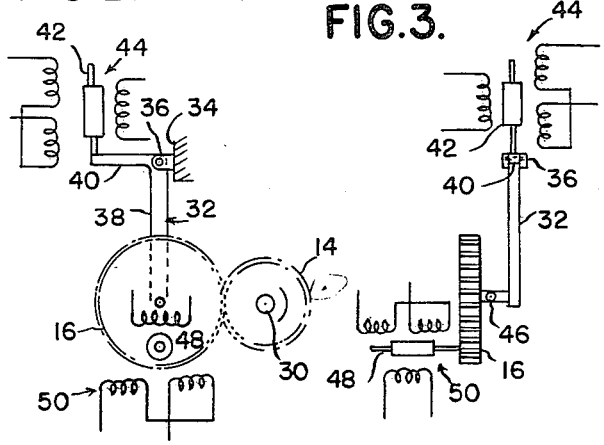
FIGURES 2 and 3 are diagrammatic representations of one type of gear gauge that may be used with the apparatus illustrated in FIGURE 1.

More specifically the means 12 for comparing checking gears with a master gear comprises a gear gauge 26, shown diagrammatically in FIGURES 2 and 3, and a recording, storage and reproduction unit 28. The gear gauge 26 illustrated in FIGURES 2 and 3 is operable to develop an electric signal representative of the eccentricity or run-out of a work gear with respect to a master gear and an electric signal representative of the departure of the helix angle of the teeth of the work gear from the desired helix angle of the teeth of the master gear.

The gear gauge 26 comprises means 30 for rotatably mounting a checking gear 14. A bell crank lever 32 is pivotally secured to a fixed support 34 by pivot means 36. Bell crank lever 32 includes the arm 38 for pivotally and rotatably supporting the master gear 16 in mesh with the checking gear 14 and the arm 40 for supporting for movement therewith the core 42 of a linear differential transformer generally indicated 44 for movement therewith. As indicated best in FIGURE 3 the master gear 16 is mounted on arm 38 by pivot means 46 for angular movement about an axis perpendicular to its axis of rotation.

The core 48 of a second linear differential transformer 50 is secured to and extends perpendicularly from the master gear 16. Core 48 is spaced radially outwardly from the axis of rotation of master gear 16 as best shown in FIGURE 3 and will be caused to move axially with master gear 16 on pivoting of the master gear 16 about pivot means 46.

The gear gauge 26 is thus operable to produce an electric signal proportional to the run-out of a checking gear 14 with respect to the master gear 16 on rotation of the checking gear 14 with the master gear 16 in mesh therewith. During rotation of the checking gear the master gear 16 is caused to rotate and will cause arm 38 of bell crank lever 32 to pivot about pivot mounting 36 in accordance with the run-out of the checking gear. Arm 40 of bell crank lever 32 is thus caused to move whereby the core of the transformer 44 is moved to produce the desired electric signal representative of the run-out characteristic of the checking gear with respect to the master gear.

An electric signal proportional to the difference in helix angle of the teeth of a checking gear 14 and the master gear 16 is developed by the transformer 50 on rotation of the master gear 16 in mesh with the checknig gear 14 since the master gear 16 is pivotally mounted on arm 32 by pivot means 46 so that the plane of the master gear will move angularly with respect to the fixed plane of rotation of the checking gear on variation of the helix angle of the meshed teeth of the checking gear and master gear. Angular movement of the plane of the master gear about pivot point 46 causes core 48 to move longitudinally whereby a signal proportional to the difference in the helix angle of the meshed teeth of the two gears is developed by transformer 50.

While a particular gear gauge 26 has been disclosed it will be understood that the gear gauge 26 as illustrated in FIGURES 2 and 3 may be any other gear gauge capable of developing an electric signal proportional to the difference in characteristics of a master gear and a gear compared therewith.

The signals developed by the gear gauge 26 are recorded in the storage unit 28 for subsequent repetitive reproduction. The storage unit 28 may, for example, be an endless tape having a plurality of information channels and including read-in and read-out heads for storing and reproducing a plurality of times information received in the form of a variable electric signal. The exact details of the storage unit 28 are not essential to the present invention and therefore since such units are well known in the electrical arts they will not be considered in detail.

The channels 18 and 20 are similar. Channel 18 includes a gear gauge 52 for measuring the run-out of work gears with respect to a checking gear 14 which has been compared to master gear 16 with respect to the run-out thereof. Gear gauge 52 may therefore be similar to the gauge 26 illustrated in FIGURES 2 and 3 with the exception that the pivot mounting 46 for the master gear 16 and the transformer 50 are not necessary since only the run-out of the work gears is to be compared with the run-out of a checking gear by means of gauge 52.

In the comparison a checking gear previously compared to the master gear for run-out is rotatably mounted on the arm 38 in the position shown for master gear 16 while the work gears to be compared against the checking gear are mounted in the position of the checking gear 14 as shown in FIGURES 2 and 3. The signals developed by the transformer of gear gauge 52 will then be representative of the sum of the run-out of the checking gear and the work gears with respect to the master gear.

The electric signals produced by the transformer of gear gauge 52 are amplified in amplifier 54 and passed to the difference unit 56. The difference unit 56 is provided to subtract the reproduced signal obtained on comparison of the checking gear used in gear gauge 52 with the master gear for run-out which signal has been previously stored for repetitive reproduction in the storage unit 28. It will be understood that the output of the difference unit will therefore be electric signals representative of the run-out of the work gears with respect to the master gear.

Thus it will be evident that the apparatus thus far described provides means for comparing a characteristic of a work gear with a characteristic of a master gear without the necessity of comparing each different workpiece with the master gear. The useful life of a master gear is thus greatly increased. Also, a single master gear may be used to provide stored repetitively reproducible signals to be used with a plurality of checking gears which checking gears have larger tolerances than those required of a master gear for direct comparison with work gears and are less expensive to produce than the master gears.

In addition it will be noted that since similar errors which are inherent in both the gauges 26 and the gauge 52 are subtracted from each other that these inherent errors will be removed from the final difference signal to produce a truer representation of the variance of the characteristic of the work gear from the desired characteristic of the master gear than was previously obtained. Further the checking gears may be checked with the master gear to provide a new signal for storing representative of the departure of the characteristic of the checking gear and master gear as often as desirable whereby errors due to wear of the checking gear may be greatly reduced.

As previously indicated the channel 20 is entirely similar to the channel 18 with the exception of the fact that the gear gauge 58 of the channel 20 is constructed to develop an electric signal proportional to the sum of the variation of the helix angle of the teeth of the work gears with respect to the helix angle of the teeth of a checking gear which has been checked against the master gear. The signal developed by gear gauge 58 is amplified in amplifier 60 and fed to difference unit 62.

The signal from the storage unit 28 proportional to the sum of the variation of the helix angle of the teeth of the master gear and the helix angle of the teeth of the checking gear used in gauge 58 which has previously been stored in storage unit 28 is subtracted from the signal from amplifier 60 in difference unit 62 to produce a signal representative of the variation in helix angle of the teeth of the work gears and the teeth of the master gear.

The signals from the difference units 56 and 62 are fed to error detectors 64 and 66 respectively wherein they are compared with reference voltages to determine whether the difference indicated between the characteristics of the work gears and the characteristics of the master gear is sufficient to warrant rejection of the work gears. The signals from the error detectors are then passed to a classification unit 24 through which the gears after being checked by gear gauges 52 and 58 are passed. The signals from the error detector 64 and 66 are delayed by time delays 68 and 70 of the means 22 before arriving at classification unit 24 so that when the gears pass through the classification unit 24 the gears are sorted according to the variation of their characteristics from the characteristics of the master gear.

The error detectors 64 and 66 and the classification unit 24 are well known in the art and since the details thereof form no part of the present invention they will not be considered further in detail. For a detailed description of such apparatus reference is made to the commonly owned copending patent applications Serial Nos. 466,118, filed November 1, 1954 (now Patent No. 2,983,-375) and 795,005, filed February 25, 1959.

In operation of the apparatus 10 a master gear 16 is first compared with a different checking gear 14 for each gear characteristic which it is desired to check and the electric signal proportional to the departure of the characteristics of the master gear and the individual checking gears are placed in separate storage channels in storage unit 28. The characteristics of the separate checking gears 14 which have been compared with the master gear 16 are then compared with the characteristics of a plurality of work gears in the separate channels 18 and 20 to produce an electric signal representative of the sum of the difference between the compared characteristics of the work gear and checking gears and the checking gears and master gear.

The stored signals are then reproduced and subtracted from the individual signals produced on comparison of the checking gears with the work gears for the same characteristics whereby individual signals are produced representative of the departure of the characteristics of the work gears with respect to the same characteristics of the master gear for each of the characteristics thereof checked by the different checking gears. The signals thus produced are then used to sort the gears by means of the error detectors 64 and 66 and the classification unit 24.

It will be understood that while two characteristics of gears, mainly the run-out and helix angle, have been considered in the above disclosure that other channels similar to channels 18 and 20 may be used to check other characteristics of work gears against a master gear. Further it will be understood that when it is necessary to synchronize the reproduction of the signals from the storage unit with the signals produced by the gear gauges in the difference units for such characteristics as tooth spacing that such synchronization may be provided either mechanically or electrically as indicated diagrammatically at 72 in FIGURE 1.

Also while a particular embodiment of the invention has been disclosed in which a master gear was compared against the checking gears to determine the departure of the characteristics of the checking gears from the desired characteristics thereof other means for developing reproducible signals representative of the departure of the characteristics of the checking gears with respect to desired characteristics are possible. For example the departure of the characteristics of the checking gears from desired characteristics thereof may be determined by measurement with hand tools and later translated into an electrical signal by well known means for storage. It is the intent to include all such modifications of the disclosed subject matter as may suggest themselves to those in the art within the scope of the invention.

The drawings and the foregoing specification constitute a description of a method of and means for gear gauging in such full, clear, concise and exact terms as to enable any person skilled in the art to practice the invention, the scope of which is indicated by the appended claims.

What we claim as our invention is:

1. Apparatus for determining the departure of a characteristic of a work gear from a characteristic of a master gear, comprising gauge means for comparing a characteristic of a checking gear with the characteristic of the master gear, gauge means for comparing the characteristic of the work gear with the characteristic of the checking gear compared with the characteristic of the master gear and comparing means operably associated with both said gauge means for combining the results of the comparisons to produce a result representative of the departure of the characteristic of the work gear from the characteristic of the master gear.

2. Apparatus for determining the departure of a characteristic of work gears from the same characteristic of a master gear, comprising gauge means for comparing a characteristic of a checking gear with the characteristic of the master gear, gauge means for comparing the characteristic of the work gears with the characteristic of the checking gear compared with the characteristic of the master gear and comparing means operably associated with both said gauge means for combining the results of the comparison of each work gear with the checking gear with the result of the comparison of the checking gear with the master gear to produce results representative of the departure of the characteristic of the work gears from the same characteristic of the master gear.

3. Apparatus for determining the departure of a characteristic of work gears from a desired characteristic of a master gear, comprising gauge means for comparing a characteristic of a checking gear with the desired characteristic of the master gear and developing a signal representative of the departure of the characteristic of the checking gear from the desired characteristic of the master gear, gauge means for comparing the characteristic of the work gears with the characteristic of the checking gear compared with the desired characteristic of the master gear and developing signals representative of the sum of the departure of the characteristic of the checking gear and the characteristic of the work gears from the desired characteristic of the master gear for each work gear, and comparing means operably associated with both said gauge means for subtracting the first mentioned signal from each of the last mentioned signals to produce signals representative of the departure of the characteristic of the work gears from the desired characteristic of the master gear.

4. Apparatus for determining the departure of a characteristic of work gears from a desired characteristic of a master gear, comprising gauge means for comparing a characteristic of a checking gear with the desired characteristic of the master gear, means operably associated with said gauge means for developing an electric signal representative of the departure of the characteristic of the checking gear from the desired characteristic of the master gear, other gauge means for comparing the characteristic of the work gears with the characteristic of the checking gear compared with the desired characteristic of the master gear, means operably associated with said other gauge means for developing electric signals representative of the sum of the departure of the characteristic of the checking gear and the characteristic of the work gears from the desired characteristic of the master gear for each work gear, and comparing means operably associated with both said gauge means for electrically subtracting the first mentioned signal from each of the last mentioned signals to produce an electric signal representative of the departure of the characteristic of the work gears from the desired characteristic of the master gear.

5. Apparatus for determining the departure of a characteristic of work gears from a desired characteristic of a master gear, comprising gauge means for comparing a characteristic of a checking gear with the desired characteristic of the master gear, means operably associated with said gauge means for developing an electric signal representative of the departure of the characteristic of the checking gear from the desired characteristic of the master gear, means for storing and repetitively reproducing said developed electric signal, other gauge means for comparing the characteristic of the work gears with the characteristic of the checking gear compared with the desired characteristic of the master gear, means operably associated with said other gauge means for developing electric signals representative of the sum of the departure of the characteristic of the checking gear and the characteristic of the work gears from the desired characteristic of the master gear for each work gear, and comparing means operably associated with both said gauge means for electrically subtracting the reproduced first mentioned signal from each of the last mentioned signals to produce an electric signal representative of the departure of the characteristic of the work gears from the desired characteristic of the master gear.

6. Apparatus for determining the departure of a plurality of characteristics of work gears from the desired characteristics of a master gear, comprising gauge means for comparing a different particular characteristic of a plurality of checking gears with the same different characteristic of the master gear and developing signals representative of the departure of said particular characteristics from the same characteristics of the master gear, separate gauge means for comparing the particular characteristic of each of the plurality of checking gears compared with the same characteristic of the master gear with the same characteristic of the work gears and for developing a signal representative of the sum of the departure of the particular characteristic of the checking gear and the same characteristic of the work gears from the same characteristic of the master gear for each work gear, and separate comparing means operably associated with both said gauge means for subtracting the first mentioned signal from each of the last mentioned signals due to the comparisons of the same characteristics of the checking gear to produce signals representative of the departure of the characteristics of the work gears from the same characteristics of the master gear.

7. Apparatus for comparing the helix angle and run-out of work gears with respect to a master gear comprising gauge means for comparing the helix angle of one checking gear and the run-out of another checking gear with the master gear and means operably associated with said gauge means for developing electric signals representative of the run-out of the one checking gear and the departure of the helix angle of the other checking gear from the helix angle of the master gear, separate gauge means for comparing the helix angle of the one checking gear, the helix angle of which was compared with the helix angle of the master gear with the helix angle of the work gears and for determining the run-iut of the work gears with respect to the other checking gear, and means operably associated with the separate gauge means for developing electric signals representative of the sum of the departure of the helix angle of the checking gear compared with the helix angle of the master gear and the helix angle of each of the work gears and for developing electric signals representative of the sum of the run-out of the checking gear compared with the master gear and the run-out of the work gears compared to the checking gear for each work gear, and separate comparing means operably associated with each of said separate gauge means and said gauge means for electrically substracting the first mentioned helix angle signal from the last mentioned helix angle signals and for electrically subtracting the first mentioned run-out signal from the last mentioned run-out signals to provide electric signals representative of the departure of the helix angle of the work gears from the helix angle of the master gear and the run-out of the work gears with respect to the master gear.

8. Structure as set forth in claim 7 wherein the gauge means for comparing the master gear and checking gears comprises means for rotatably mounting a checking gear, a bell crank lever, means for rotatably and pivotally mounting the master gear on one arm of the bell crank lever and in mesh with the checking gear, a linear differential transformer haxing a core secured to the other arm of the bell crank lever for movement therewith and a second linear differential transformer having a core extending perpendicularly from one side of the master gear and remote from the axis of rotation of the master gear.

9. Structure as set forth in claim 7 wherein the means for comparing said one checking gear and the work gears comprises means for rotatably mounting a checking gear, a bell crank lever, means for rotatably and pivotally mounting the checking gear on one arm of the bell crank lever and in mesh with a work gear, and a linear differential transformer having a core secured to the other arm of the bell crank lever for movement therewith.

10. Structure as set forth in claim 7 wherein the means for comparing said other checking gear and the work gears comprises means for rotatably mounting a checking gear, a bell crank lever, means for rotatably mounting the checking gear on one arm of the bell crank lever and in mesh with a work gear, and a linear differential transformer having a core extending perpendicularly from one side of the master gear and remote from the axis of rotation of the master gear.

11. A method for determining the departure of a characteristic of work gears from a characteristic of a master gear comprising comparing a characteristic of a checking gear with the characteristic of the master gear, comparing the characteristic of the work gears with the characteristic of the checking gear compared with the characteristic of the master gear and combining the results of the comparisons to produce results representative of the departure of the characteristic of the work gears from the characteristic of the master gear.

12. A method for determining the departure of a characteristic of work gears from the same characteristic of a master gear comprising comparing a characteristic of a checking gear with the characteristic of the master gear, and developing an electrical signal representative of the departure of the compared characteristic of the master gear and checking gear, comparing the characteristic of the work gears with the characteristic of the checking gear compared with the characteristic of the master gear, and developing electrical signals representative of the combined departure of the checking gear and each work gear from the desired characteristic of the master gear, and subtracting each of the last mentioned signals from the first mentioned signal separately to produce electric signals representative of the departure of the characteristic of the work gears from the same characteristic of the master gear.

13. A method for determining the departure of a characteristic of work gears from a desired characteristic of a master gear comprising comparing a characteristic of a checking gear with the desired characteristic of the master gear, and developing an electrical signal representative of the departure of the compared characteristic of the master gear and checking gear, storing the developed signal for repetitive reproduction, comparing the characteristic of the work gears with the characteristic of the checking gear compared with the desired characteristic of the master gear, and developing electrical signals representative of the combined departure of the checking gear and each work gear from the desired characteristic of the master gear, and subtracting each of the last mentioned signals from the reproduced first mentioned signal separately to produce electric signals representative of the departure of the characteristic of the work gears from the desired characteristic of the master gear.

14. A method for determining the departure of a plurality of characteristics of work gears from desired characteristics of a master gear comprising comparing a different one of the plurality of characteristics of a separate checking gear with the desired same characteristic of the master gear, comparing the individual characteristics of the work gears with the same characteristics of each of the checking gears compared with the same desired characteristic of the master gear, and combining the results of the comparisons of the same characteristics to produce results representative of the departure of the characteristics of the work gears from the desired characteristics of the master gear.

15. A method for sorting gears in accordance with the departure of a characteristic of the gears from a desired characteristic of a master gear comprising comparing a characteristic of a checking gear with the desired characteristic of the master gear, comparing the characteristic of the work gears with the characteristic of the checking gear compared with the desired characteristic of the master gear, and combining the results of the comparisons of the work gears and checking gear with the result of the comparison of the master gear and checking gear to produce results representative of the departure of the characteristic of the work gears from the desired characteristic of the master gear, producing signals in accordance with the magnitude of the result of each comparison, delaying the signals and operating a gear classifier in accordance with the delayed signals to pass or reject the work gears.

16. Apparatus for determining the departure of a characteristic of work gears from a desired characteristic of a master gear, comprising gauge means for comparing a characteristic of a checking gear with the desired characteristic of the master gear, means operably associated with said gauge means for developing an electric signal representative of the departure of the characteristic of the checking gear from the desired characteristic of the master gear, means for storing and repetitively reproducing said developed electric signal, other gauge means for comparing the characteristic of the work gears with the characteristic of the checking gear compared with the desired characteristic of the master gear, means operably associated with said other gauge means for developing electric signals representative of the sum of the departure of the characteristic of the checking gear and the characteristic of the work gears from the desired characteristic of the master gear for each work gear, means operably associated with the storing means and other gauge means for synchronizing each of the last mentioned signals with a reproduced first mentioned signal, and comparing means operably associated with both said gauge means for electrically subtracting the reproduced first mentioned signal from each of the last mentioned signals to produce an electric signal representative of the departure of the characteristic of the work gears from the desired characteristic of the master gear.

17. A method for determining the departure of a characteristic of work gears from a desired characteristic of a master gear comprising comparing a characteristic of a checking gear with the desired characteristic of the master gear, and developing an electrical signal representative of the departure of the compared characteristic of the master gear and checking gear, storing the developed signal for repetitive reproduction, comparing the characteristic of the work gears with the characteristic of the checking gear compared with the desired characteristic of the master gear, and developing electrical signals representative of the combined departure of the checking gear and each work gear from the desired characteristic of the master gear, synchronizing each of the last mentioned signals and a reproduced first mentioned signal and subtracting each of said last mentioned signals from said reproduced first mentioned signal separately to produce electric signals representative of the departure of the characteristic of the work gears from the desired characteristic of the master gear.

18. Apparatus for determining the departure of a characteristic of work gears from a desired characteristic thereof, comprising means for reproducing a signal resulting from comparing a characteristic of a checking gear with the desired characteristic, means for producing signals resulting from comparing the characteristic of the work gears with the characteristic of the checking gear and means operably associated with both said means for combining said first signal with each of said last signals to produce signals representative of the departure of the characteristic of the work gears from the desired characteristic.

19. Apparatus for determining the departure of a characteristic of work gears from a desired characteristic thereof, comprising means for developing an electric signal representative of the departure of the characteristic of the checking gear from the desired characteristic, means for storing and repetitively reproducing said developed electric signal, other means for comparing the characteristic of the work gears with the characteristic of the checking gear, means operably associated with said other means for developing electric signals representative of the sum of the departure of the characteristic of the checking gear and the characteristic of the work gears from the desired characteristic for each work gear, and means operably associated with both the said means for electrically subtracting the reproduced first mentioned signal from each of the last mentioned signals to produce an electric signal representative of the departure of the characteristic of the work gears from the desired characteristic.

20. A method for determining the departure of a characteristic of work gears from a desired characteristic thereof comprising comparing a characteristic of a checking gear with the desired characteristic, comparing the characteristic of the work gears with the characteristic of the checking gear and combining the results of the comparisons to produce results representative of the departure of the characteristics of the work gears from the desired characteristic.

21. A method for determining the departure of a characteristic of work gears from a desired characteristic thereof comprising comparing a characteristic of a checking gear with the desired characteristic, developing an electrical signal representative of the departure of the desired characteristic and the characteristic of the checking gear, storing the developed signal for repetitive reproduction, comparing the characteristic of the work gears with the characteristic of the checking gear, and developing electrical signals representative of the combined departure of the checking gear and each work gear from the desired characteristic, and subtracting each of the last mentioned signals from the reproduced first mentioned signal separately to produce electric signals representative of the departure of the characteristic of the work gears from the desired characteristic.

22. Apparatus for determining the departure of a characteristic of a work gear from a desired characteristic thereof, comprising means for producing a signal resulting from comparing a characteristic of a checking gear with the desired characteristic, means for producing signals resulting from comparing the characteristic of the work gears with the characteristic of the checking gear and means operably associated with both said means for combining said first signal with said last signal to produce a signal representative of the departure of the characteristic of the work gear from the desired characteristic.

References Cited in the file of this patent

UNITED STATES PATENTS

| 1,222,392 | Green | Apr. 10, 1917 |
| 2,821,024 | Nyland | Jan. 28, 1958 |